United States Patent [19]

Erdelitsch et al.

[11] Patent Number: 4,733,030
[45] Date of Patent: Mar. 22, 1988

[54] STEERING COLUMN SWITCH FOR MOTOR VEHICLES

[75] Inventors: Herbert Erdelitsch; Walter Hecht; Horst Rachner, all of Bietigheim-Bissingen, Fed. Rep. of Germany

[73] Assignee: SWF Auto-Electric GmbH, Bietigheim-Bissingen, Fed. Rep. of Germany

[21] Appl. No.: 942,169

[22] Filed: Dec. 16, 1986

[30] Foreign Application Priority Data

Dec. 18, 1985 [DE] Fed. Rep. of Germany ....... 3544804

[51] Int. Cl.$^4$ .............................................. H01H 9/00
[52] U.S. Cl. .................. 200/61.54; 200/61.27
[58] Field of Search .................. 200/110 A, 11 J, 115, 200/61.27, 61.3, 61.31, 61.34, 61.35, 61.54–61.57

[56] References Cited

U.S. PATENT DOCUMENTS 3,939,313  2/1976  Hayashi et al. .................... 200/11 J
3,944,765  3/1976  Kawai et al. ...................... 200/61.27

FOREIGN PATENT DOCUMENTS 2931903   2/1980  Fed. Rep. of Germany .
3121659  12/1982  Fed. Rep. of Germany ... 200/61.54
3202114   7/1983  Fed. Rep. of Germany .

Primary Examiner—J. R. Scott
Attorney, Agent, or Firm—James B. Raden; Robert P. Seitter

[57] ABSTRACT

In a steering column switch for motor vehicles a hazard-warning signal switch is clipped onto the printed circuit board of the turn-signal switch. The turn-signal switch is contacted at the upper side and the hazard-warning signal switch at the underside of the printed circuit board. The hazard-warning signal switch is compactly constructed and does not impede the movability of the other switch levers and switch slides of the steering column switch.

6 Claims, 5 Drawing Figures

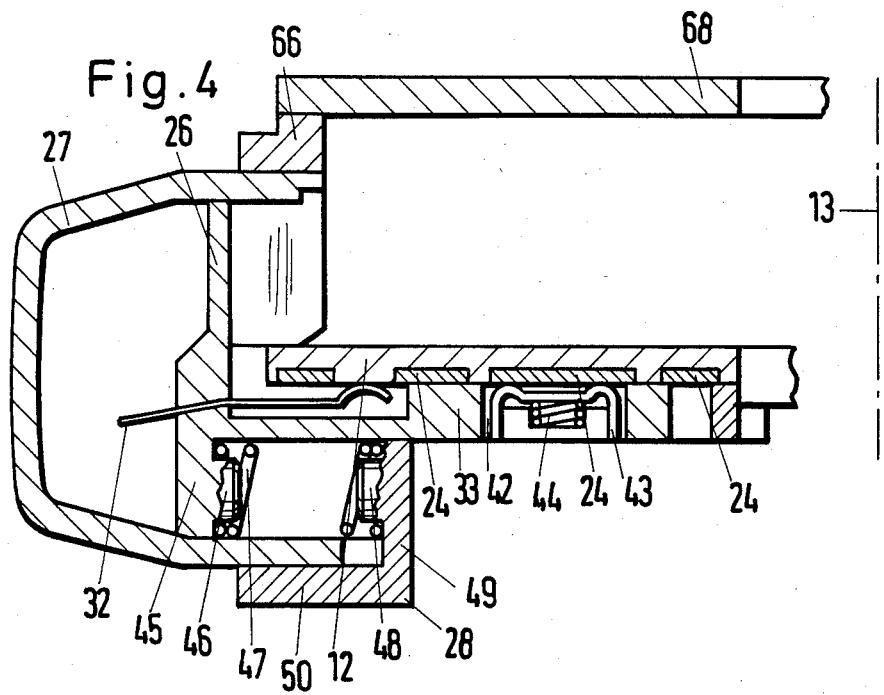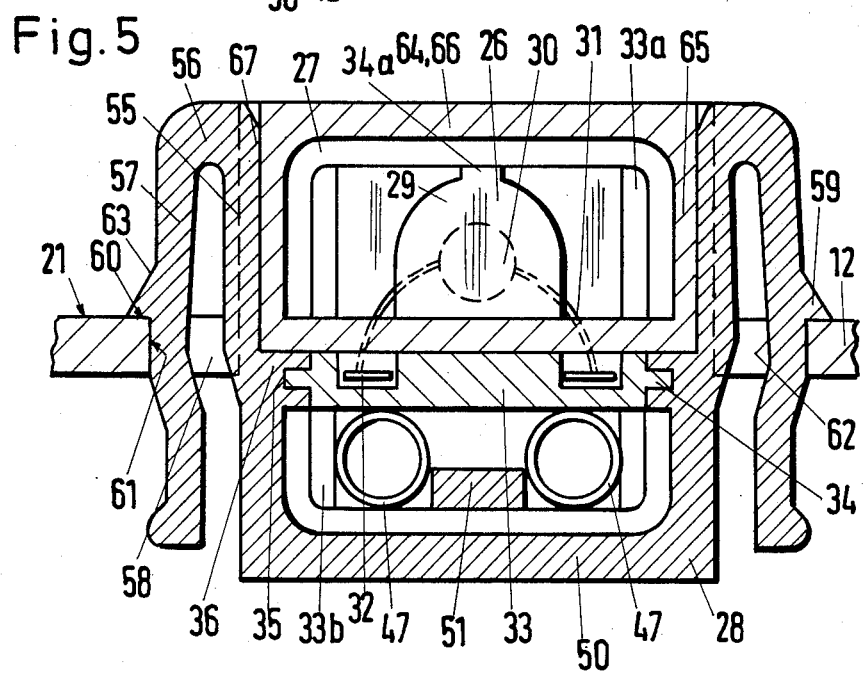

STEERING COLUMN SWITCH FOR MOTOR VEHICLES

BACKGROUND OF THE INVENTION

The invention pertains to a steering column.

A steering column switch is for example know from the German specification OS No. 3,202,114. The steering column switch has two switch levers for actuating the windscreen wiper and the turn-signal flasher which are arranged approximately diametrically opposite each other relative to the steering spindle axis. The switch levers are arranged in superimposed planes and are swivellably mounted about a shaft extending parallel to the steering spindle axis. Each switch slide is shaped in the manner of a ring segment which can move across a printed circuit board extending perpendicular to the steering spindle axis. Between the two switch levers there is a cap-shaped hazard-warning signal switch actuating member, by which the switch slide is displaceable perpendicular to the plane of the printed circuit board. In the peripheral direction of the printed circuit board the switch slide has the shape of a circle segment and carries bridging contracts spaced from portions extending above and below the printed circuit board. The bridging contacts co-operate with stationary contacts formed as cone contacts. In the peripherl direction of the printed circuit board the stationary contacts are arranged side by side. The switch slide is mounted on a cylindrical socket having lateral retaining strips by means of which it is clipped into the peripheral wall of the switch housing surrounding the printed circuit boards. Thus the hazard-warning signal switch assembly is relatively high and wide which is unfavorable for the movability and operability of the switch lever. Some car manufacturers do not want large hazard-warning signal switches for styling reasons. Furthermore there is a risk of inadvertently turning the actuating cap when the hazard-warning signal switch is operated, because this cap is only secured to the switch slide by means of relatively small pins.

SUMMARY OF THE INVENTION

It is one object of the invention to create a steering column switch whose hazard-warning switch is compactly constructed and does not impede movability of the switch lever or switch levers and the switch slide or the switch slides.

In accordance with the invention a steering column switch has a printed circuit board extending substantially to the steering spindle axis with stationary contacts on both sides perpendicular thereof stationary controls for the hazard-warning switch being provided on one side thereof.

Because stationary contacts for the hazard-warning switch are provided only on one side of the printed circuit board, the hazard warning switch must extend solely over one of the two sides of the printed circuit board, so that a low overall height of the hazard-warning switch is possible. Because for a switching action the switch slide must only be slidingly moved towards the steering spindle axis or away from it, the hazard-warning switch can also be made small in the peripheral direction of the printed circuit board. The switch slide thereby moves along the printed circuit board, so that the latter contributes to its guidance.

When all electric components of the hazard-warning switch are combined on the switch slide it is possible to test their performance before the hazard warning switch is mounted. Furthermore in case of a possible later failure of the hazard warning member it is only necessary to exchange a small switch area.

BRIEF DESCRIPTION OF THE DRAWING

The invention will be better understood from a reading of the following detailed description in conjunction with the drawing in which:

FIGS. 3 to 5 are sections through the steering column switch taken on the lines III—III, IV—IV and V—V of FIG. 1.

DETAILED DESCRIPTION

Figure 1:
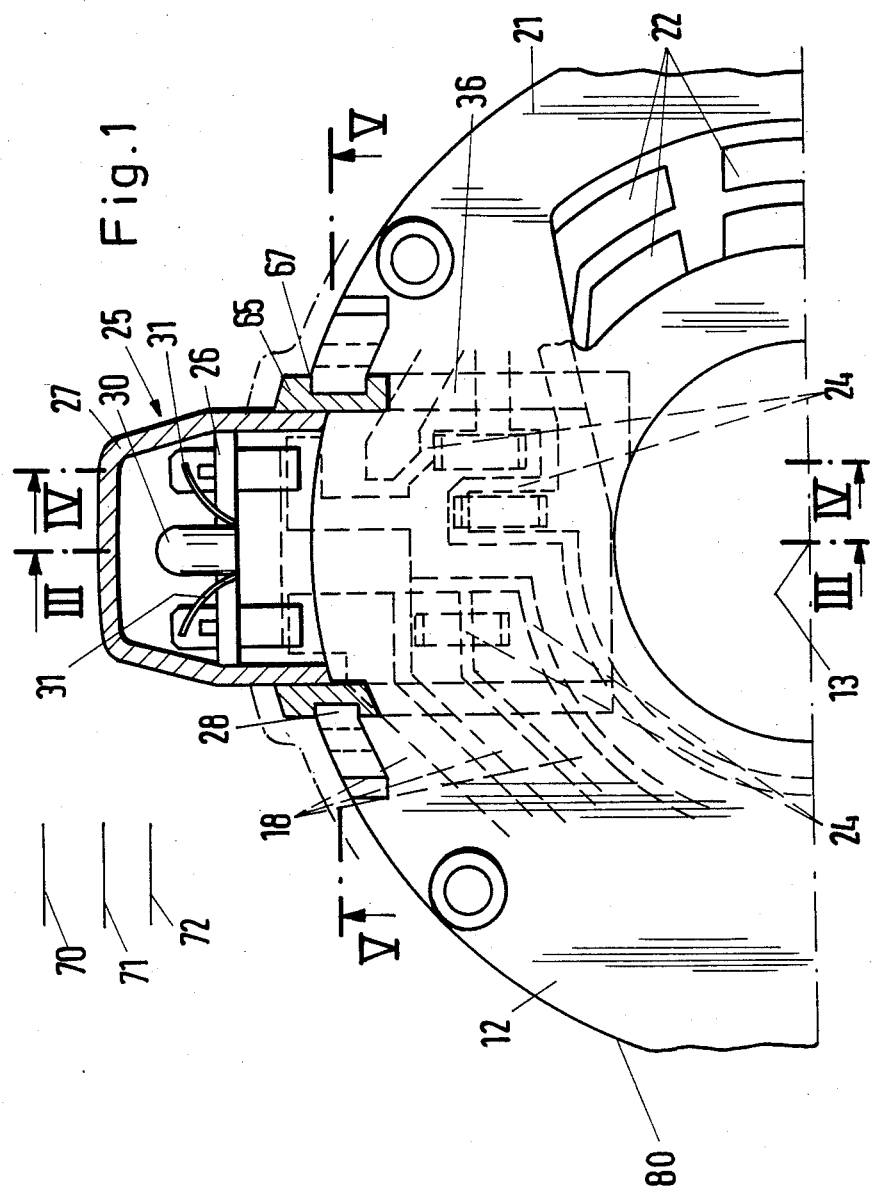
FIG. 1 is a section through a steering column switch in a plane perpendicular to the axis after steering spindle.
Figure 3:
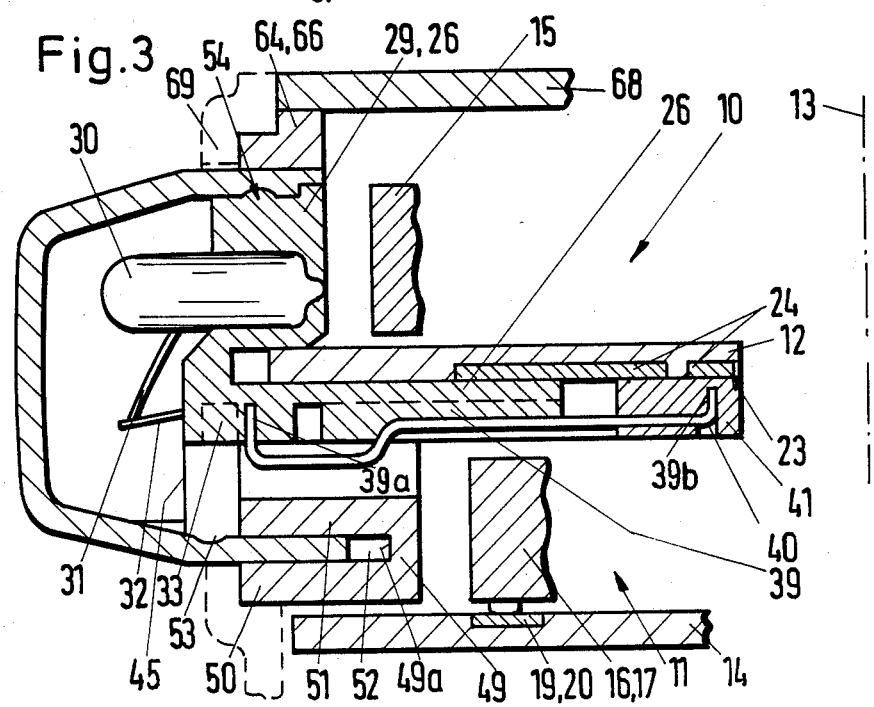

As indicated in FIGS. 1 and 3 the steering column switch comprises a turn-signal switch 10 and a wiper switch 11. To the turn-signal switch 10 pertains a substantially ring-shaped printed circuit board 12 which extends perpendicularly to the imaginary steering spindle axis 13. Part of the wiper switch 11 is an also ring-shaped printed circuit board 14, which also extends perpendicular to the imaginary axis 13 and in a plane extending below the plane formed by the printed circuit board 12. A switch lever 15 pertains to the turn-signal switch 10 and a switch lever 16 to the wiper switch 11. At about diametrically opposite points of the switch the switch levers 15 and 16 are swivellably and tiltably mounted about a shaft not shown in the drawing and extending parallel to the steering spindle axis 13. Accordingly, the switch lever 16 can move across an angular range of the printed circuit board 14 of approximately 90°.

The printed circuit boards 12 and 14 consist of plastic material and each has a plurality of conductors 18 or 19 punched out from a sheet metal blank and injection-moulded into the plastics material. In the printed circuit board 14 of the wiper switch 11 recesses in the plastics material are provided in sections, so that the conductors 19 have areas 20 which have to be regarded as stationary contacts of the wiper switch 11. As FIG. 3 shows the stationary contacts 20 are positioned on the upper side of the printed circuit board 14. As far as the printed circuit board 12 is concerned recesses are provided in the plastics material in such a way that the conductors 18 are bare in sections both on the upper side 21 of the printed circuit board 12 and also on the underside 23 of the printed circuit board 12, so that the printed circuit board 12 has stationary contacts 22 on its upper side 21 and on its underside stationary contacts 24. Thereby the stationary contacts 22 on the upper side 21 of the printed circuit board 12 are part of the turn-signal switch 10, whereas the stationary contacts 24 on the underside 23 of the printed circuit board 12 are part of a hazard warning switch, namely a harard-warning signal switch 25. The hazard-warning signal switch 25 includes a switch slide 26 which consists of plastics material and extends substantially below the printed circuit board 12. An actuating member is locked upon the switch slide 26, which actuating member is formed as a transparent red plastics cap 27. The switch slide 26 and the cap 27 are mounted on a socket 28, whcih is clipped onto the printed circuit board 12 of the turn-signal switch 10. For switching on and off the hazard-warning signal switch 25 the switch slide 26 must only be slidingly moved or displaced towards the steering spindle axis 13 or away from it by means of the actuating cap 27. Thus both in the direction of the steering spindle axis 13, i.e., in the direction of the height of the entire steering column switch, and in the peripheral direction of the printed circuit board 12 and thus also in the peripheral direction of the entire steering column switch only little space has to be provided.

Figure 2:
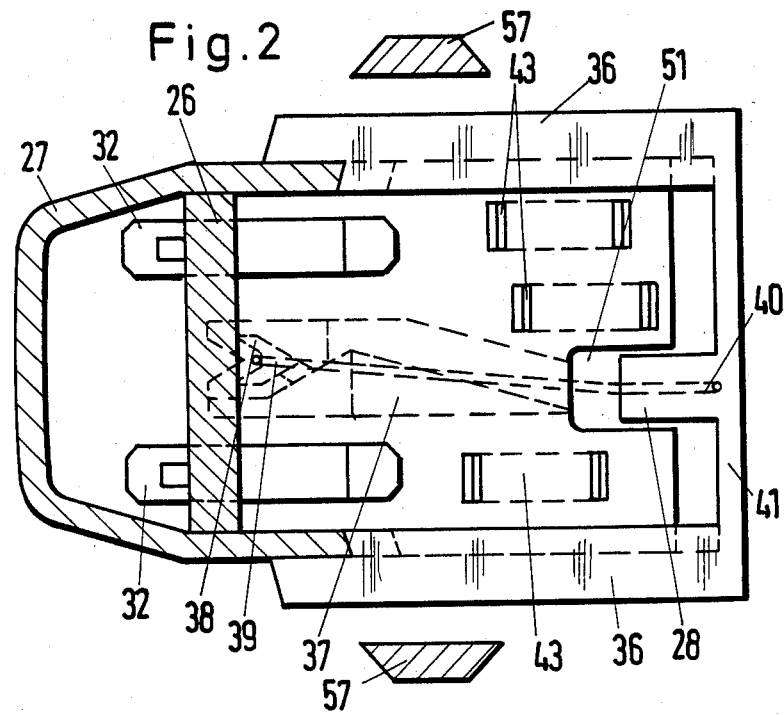
FIG. 2 is a section through the hazard-warning switch in a plane set-off relative to that of FIG. 1.

By means of a lengthening 29 centrally formed on it and extending above the printed circuit board 12 the switch slide 26 of the hazard-warning signal switch 25 encompasses an incandescent lamp 30 not having a lamp holder and emitting white light. The incandescent lamp has connecting wires 31 which are welded to contact sheets 32 inserted in a portion 33 of the switch slide 26 extending below the printed circuit board 12. As FIG. 5 shows this portion 33 of the switch slide 26 has a strip 34 on each of its longitudinal sides, which strip engages fittingly in a guide groove 35 worked into a side wall 36 of the socket 28 extending perpendicularly to the printed circuit board 12. The lengthening 29 with its upper end and thus the switch slide 26 with a stud 34a rest against the actuating cap 27. The slide walls 33a and 33b are formed onto the lateral rims of the portion 33, which side walls extend perpendicularly upwards and downwards and by means of which the switch slide 26 also rests against the actuating cap 27. As FIGS. 2 and 3 show the portions 33 of the switch slide 26 carry a locking sheet 37 extending in parallel to the printed circuit board 12, which locking sheet has a cardioid locking cam 38 at its front end. In the cardioid locking cam 38 engages a locking leaf spring 39 with its first end 39a, which with its second end 39b is inserted in a groove-shaped recess 40 worked into the limiting wall 41 of the socket 28 extending closest to the steering spindle axis 13 and perpendicularly to the printed circuit board 12. As FIGS. 1, 2 and 4 show the portion 33 of the switch slide 26 has several recesses 42 open towards the stationary contacts 24, in each of which recesses is inserted a bridging contact 43 which is supported at the lower limiting wall of the recess 42 via a spiral spring 44. On a front portion 45 of the switch slide 26 perpendicularly extending to the portion 33 there is formed a stud 46 in two places of the printed circuit board 12 adjoining each other in the peripheral direction on which stud 46 is supported a pressure spring 47 with its first end, which with its other end is supported on a stud 48 opposite the stud 46, which stud 48 is formed onto a limiting wall 49 of the socket 28 extending perpendicularly to the printed circuit board 12. As FIGS. 3 and 4 also show onto the limiting wall 49 is formed a bottom limiting wall 50 of the socket 28 extending in parallel to the printed circuit board 12, against which limiting wall 50 the actuating cap 27 of the hazard-warning signal switch 25 rests. Approximately in the centre of the extension of the limiting wall 49 in the circumferential direction of the printed circuit board 12 a lug 51 is formed on which extends in parallel to the bottom limiting wall 50. Therefore the socket 28 has a guide groove 52 for the actuating cap 27 extending in the direction of the width of the hazard-warning signal switch 25. As in FIG. 3 is also indicated both the portion 45 of the switch slide 26, which portion 45 extends below the printed circuit board 12 and in parallel to the steering spindle axis 13, and the portion 29 of the switch slide 26, which portion 29 extends above the printed circuit board 12 and in parallel to the steering spindle axis 13, have a locking strip 53 or 54, respectively. The actuating cap 27 is clipped onto these locking strips 53 and 54. The locking strips 53 and 54 are thereby arranged in such a way that the limiting wall 49 of the socket 28 extending perpendicularly to the printed circuit board 12 has a stop face 49a for the actuating cap 27 and thus also for the switch slide 26 at its inside.

As can be seen from the statements above all movable parts of the hazard-warning signal switch 25 are advantageously and easily mountable combined on the switch slide 26. A special advantage is that the lamp 30 is also mounted on the switch slide 26. Thus it can undergo a performance test and, if necessary, be exchanged without any problems before the hazard-warning signal switch 25 is mounted. Moreover, in the case of a later failure of the lamp 30 only a small switch area, namely the switch slide 26, has to be exchanged.

As FIGS. 1 and 5 further show the side walls 36 of the socket 28 of the hazard-warning signal switch 25 have in an area closely to the outer limiting rim 80 of the printed circuit board 12 a lengthening 55 extending perpendicularly to the printed circuit board 12, which lengthening extends beyond the upper side 27 of the printed circuit board 12 and at its free end 56 is equipped with outwardly directed locking hooks 57 which reach as far as closely to the bottom limiting wall 50 of the socket 28. The hazard-warning signal switch 25 is locked by means of these locking hooks 57 in apertures 58 of the printed circuit board 12 which are open towards the outer limiting rim of the printed circuit board 12. For this purpose each of the locking hooks 57 is equipped with a detent 59, which rests against the limiting wall 60 of the aperture 58 extending along the upper side of the printed circuit board 12. With its longitudinal face 61 extending below the detent 59 the locking hooks 57 rest fittingly against the limiting rims 62 of the apertures 58 extending perpendicularly to the printed circuit board 12.

As FIGS. 1 and 5 further show the lengthenings 55 of the side walls 36 are guided by a frame 64 at the side opposite the locking hooks 57, which frame 64 is formed onto the upper side 21 of the printed circuit board 12. Thereby the frame 64 has two side walls 65 extending perpendicularly to the printed circuit board 12 and an upper wall 66 extending in parallel to the printed circuit board 12. Into the side walls 65 is worked a groove 67 each extending across the entire height of the side wall 65 into which groove the lengthenings 55 of the side walls 36 of the socket 28 of the hazard-warning signal switch 25 fittingly engage. The grooves 67 fix and secure the hazard-warning signal switch 25 against twisting relative to the printed circuit board 12.

As FIGS. 3 and 4 furthermore show the entire steering column switch is upwardly closed by a cover 68 which rests against the upper wall 66 of the frame 64. Towards the side the steering column switch is closed by a housing wall 69.

In FIG. 1 the various possible positions of the actuating cap 27 of the hazard-warning signal switch 25 are furthermore indicated by three lines. Thereby the switching-on position is designated 70, the switching-off position 71 and the overlift position 72 into which the actuating cap 27 has to be brought so that with the change of the switching positions the locking leaf spring 39 shown in FIG. 2 jumps from one corner of the cordioid locking cam 38 into the other corner.

The mounting of the hazard-warning signal switch 25 on the printed circuit board 12 is thereby effected in such a way that the actuating cap 27 and thus the switch slide 26 are mechanically displaced relative to the socket 28 in such a way that they occupy the switching-on position 70. Thereafter the locking hooks 57 formed onto the socket 28 are deflected towards the interior of the hazard-warning signal switch 25 or to the side walls 36 of its socket 28 respectively and the hazard-warning signal switch 25 is conducted towards the printed circuit board 12 and through the apertures 58. Thereby the inclinations 63 of the detents 59 serve as inlet slopes. Then the locking hooks 57 are released. The hazard-warning signal switch 26 is now firmly fitted in a manner against twisting on the printed circuit board 12 of the turn-signal switch 10.

Thus the hazard-warning signal switch 25 is compact and does not either impede the movability of the switch lever 15 of the turn-signal switch 10 or of the switch lever 16 of the wiper switch 11 or of the switch slide 17 associated to these switch levers 15 and 16. Moreover it can be produced simply and at reasonable costs and has a great reliability of switching and a great security of position.

What is claimed is:

1. A switch assembly for use on a steering column of a motor vehicle, said switch assembly comprising a printed circuit board for mounting on a steering column so that it extends approximately perendicular thereto, first stationary contact means on one side of said printed circuit board and second stationary contact means on a second side thereof, said first and second sides being opposite each other, a switch lever including a first switch slide member adjacent said first stationary contact means, said switch lever being rotatably moveable for moving said first switch slide member in a plane parallel to said first side of said printed circuit board for connecting or disconnecting said first switch slide member with said first stationary contact means and selectively operating an electric circuit, an actuating member and a second switch slide member moveable in a straight line parallel and adjacent said second side of said printed circuit board for connecting or disconnecting said second switch slide member with said second stationary contact means and selectively operatibng an electric hazard warning circuit, a socket adjacent said second side of said printed circuit board which receives and guides said actuating member and said second switch slide member, said socket including a plurality of extensions extending generally perpendicular to said printed circuit board from adjacent said second side therof, each of said extensions terminating adjacent said first side of said printed circuit board in a free end, and a locking hook formed on each free end, the locking hooks bearing on said first side of said printed circuit baord and locking said second switch slide member and actuating member to said printed circuit board.

2. A switch assembly in accordance with claim 1 wherein each locking hook extends from its associated free end toward said socket.

3. A switch assembly in accordance with claim 2 wherein a frame is formed on said first side of said printed circuit board and includes side walls extending therefrom in the same direction as said extensions for guiding said extensions.

4. A switch assembly in accordance with claim 3 wherein said side walls include grooves for guiding said extensions.

5. A switch assembly in accordance with claim 2 wherein said actuating member is clipped onto said second switch slide member.

6. A switch assembly in accordance with claim 5 wherein said socket has grooves for the actuating member and second switching slide member.

* * * * *